(12) United States Patent
Kato et al.

(10) Patent No.: US 6,491,079 B2
(45) Date of Patent: Dec. 10, 2002

(54) PNEUMATIC TIRE WITH TURNUP PORTION WRAPPED ALONG OUTER PERIPHERAL FACE OF BEAD CORE

(75) Inventors: Hiroyuki Kato, Hachioji (JP); Takahiro Kimura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1 day.

(21) Appl. No.: 09/756,879

(22) Filed: Jan. 10, 2001

(65) Prior Publication Data

US 2001/0009171 A1 Jul. 26, 2001

(30) Foreign Application Priority Data

Jan. 14, 2000 (JP) ........................................ 2000-005637
Jan. 14, 2000 (JP) ........................................ 2000-005638

(51) Int. Cl.⁷ .......................... B60C 15/06; B60C 15/00
(52) U.S. Cl. ..................... 152/543; 152/539; 152/546; 152/552

(58) Field of Search .................................. 152/543, 539, 152/552, 546

(56) References Cited

FOREIGN PATENT DOCUMENTS

EP           1 024 033 A2 * 8/2000 ................. 152/543

* cited by examiner

Primary Examiner—Adrienne C. Johnstone
(74) Attorney, Agent, or Firm—Sughrue Mion, PLLC

(57) ABSTRACT

A pneumatic tire comprises at least one carcass ply of steel cords, in which a wrap part wound on a bead core along its outer peripheral face is disposed in a turnup portion of the carcass ply and at least one wire chafer wound around the bead core from a main body portion of the carcass ply toward the turnup portion thereof in a widthwise direction is embedded in the bead portion or the main body portion of the carcass ply is adequately regulated so as to enhance lateral stiffness of the bead portion.

5 Claims, 9 Drawing Sheets

PNEUMATIC TIRE WITH TURNUP PORTION WRAPPED ALONG OUTER PERIPHERAL FACE OF BEAD CORE

BACKGROUND OF THE INVENTION

1. Field of the Invention

This invention relates to pneumatic tires, particularly a pneumatic tire having an excellent bead portion durability. More particularly, it relates to a pneumatic tire capable of preventing pulling-out of a ply cord and occurrence of separation failure at an end position of a turnup portion of a carcass ply and also effectively controlling failure of a bead portion due to bending deformation of the bead portion around a rim flange under an action of a high loading to improve the bead portion durability. The invention is favorably applied to so-called heavy duty pneumatic radial tires used under conditions of a high load and a high internal pressure such as trucks, buses and the like.

2. Description of Related Art

Figure 1A:
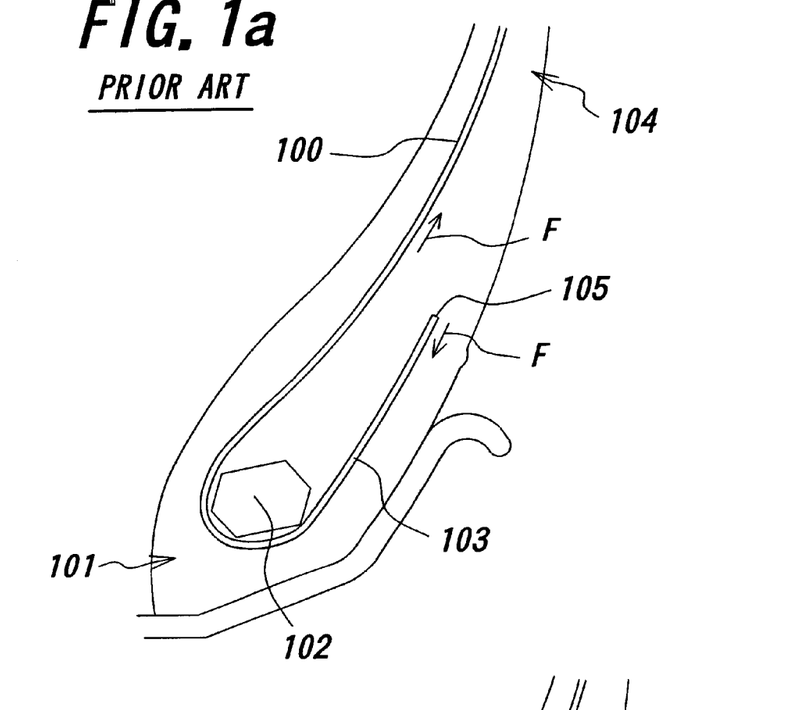
FIGS. 1a and 1b are each a diagrammatically partial section view illustrating a problem point in a bead portion structure of the conventional tire.

In order to prevent pulling-out of a ply cord during the running of the pneumatic tire under loading, as shown in FIG. 1a, a carcass ply 100 is usually wound around a bead core 102 of a bead portion 101 from an inside of the tire toward an outside thereof in a widthwise direction and a turnup portion 103 thereof is embedded and fixed in rubber.

Figure 1B:
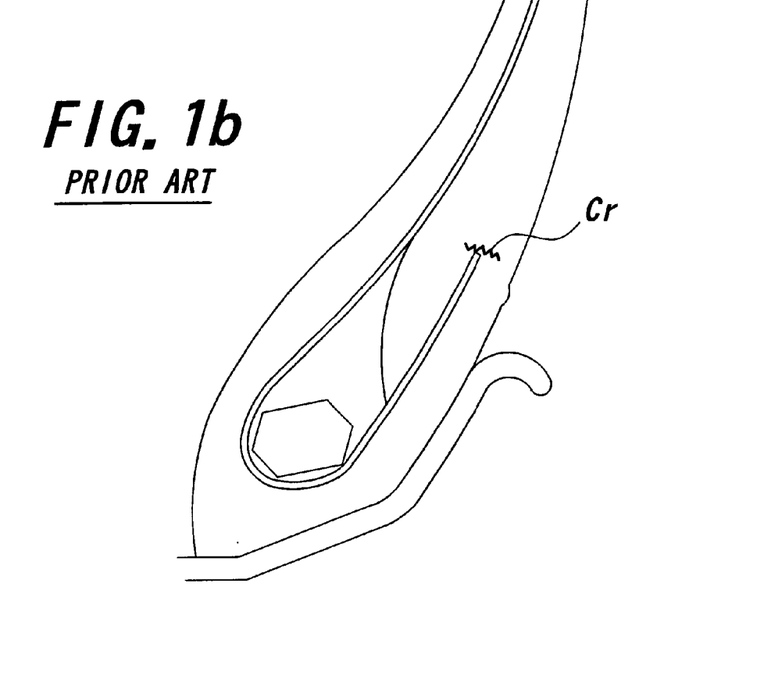

In the conventional tire having such a bead portion structure, however, a sidewall portion 104 is subjected to a large bending deformation during the running of the tire under loading, particularly under an action of a large loading and hence pulling force F is applied to the carcass ply 100 in a direction shown by an arrow in FIG. 1a, while a step difference in stiffness is caused on inside and outside of the tire in a radial direction thereof about an end position 105 of the turnup portion 103 of the carcass ply 100 and also stress concentration is repeatedly caused in the end position 105 and a neighborhood thereof. As a result, there is a problem that separation failure of the ply cord from rubber is apt to be caused and results in the occurrence of crack Cr in the bead portion as shown in FIG. 1b.

Figure 2A:
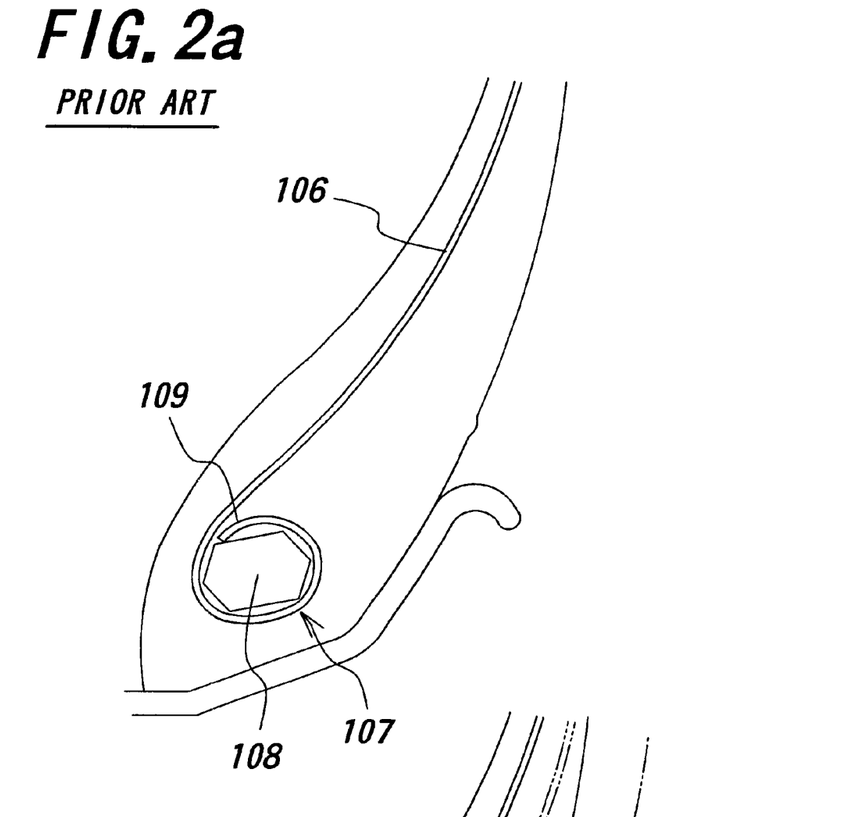
FIGS. 2a and 2b are each a diagrammatically partial section view illustrating a problem point in the conventional tire adopting such a bead portion structure that a carcass ply is wound around a bead core.

As means for preventing such a separation failure to improve the bead portion durability, there are various proposals that it is useful to render a turnup portion 107 of a carcass ply 106 into a wrap part 109 winding on the bead core along its peripheral face as shown in FIG. 2a.

Figure 2B:
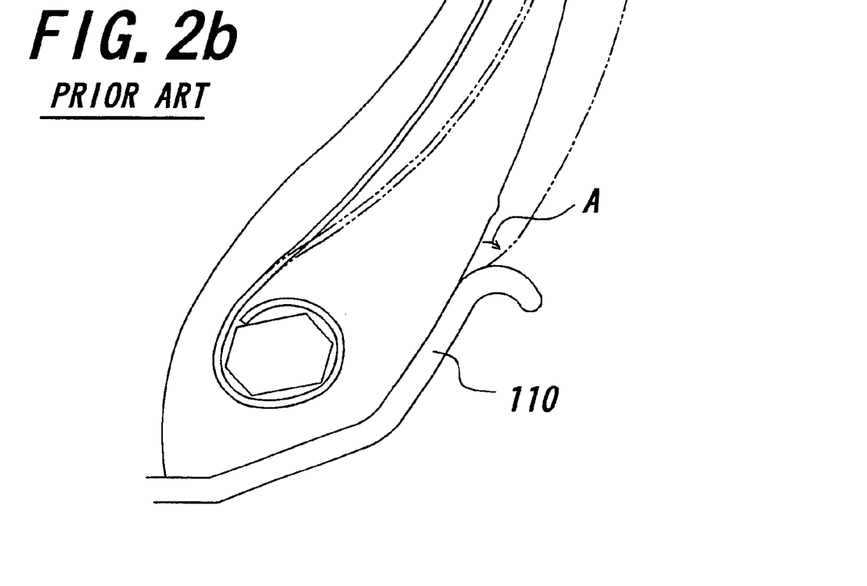

However, when a reinforcing layer such as a wire chafer or the like is not arranged in the bead portion, a large bending deformation is created in a direction shown by an arrow A about a rim flange 110 as shown by a phantom line in FIG. 2b. As a result, crack is apt to be created in the bead portion of the tire contacting with the rim flange by repeating such a bending deformation and in the worst case, there is a risk of causing the bead portion failure by the growth of such a crack.

Figure 3A:
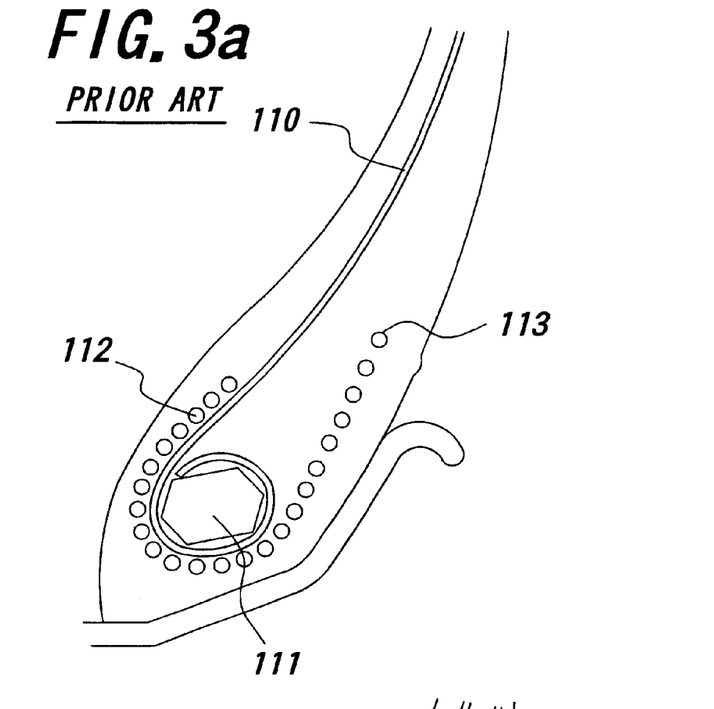
FIGS. 3a and 3b are each a diagrammatically partial section view illustrating a problem point caused at an end position of a wire chafer arranged for reinforcing the bead portion of FIG. 2.

As means for improving the bead portion durability of the tire having the above bead portion structure, it is useful that at least one reinforcing layer 112 wound around a bead core 111 from an inside of the tire toward an outside thereof in a widthwise direction at a position outside the carcass ply 110 is arranged in the bead portion to control the bending deformation of the bead portion under the action of high loading applied to the tire as shown in FIG. 3a.

Figure 3B:
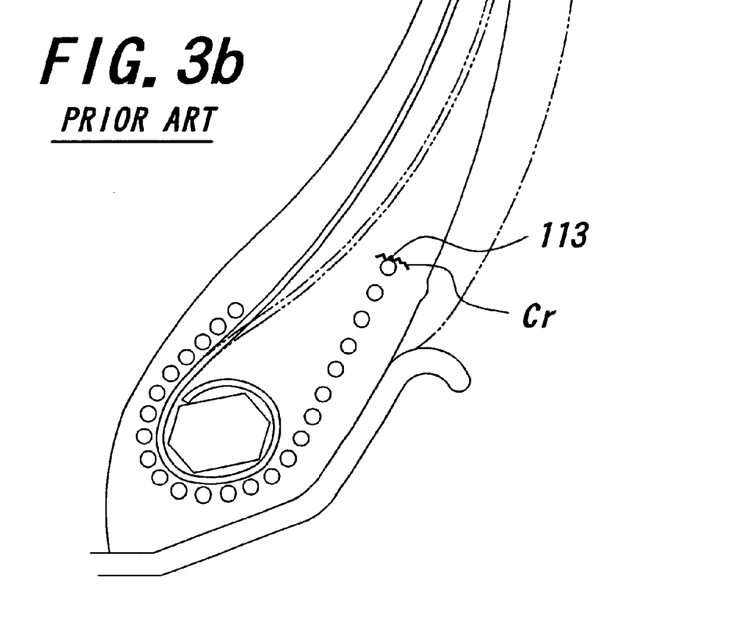

As shown in FIG. 3b, however, stress concentrates in an end position 113 of the reinforcing layer 112 and there is caused a fear of creating troubles such as crack Cr of bead portion and the like in such a position 113. As a result, such a means can not effectively improve the bead portion durability.

SUMMARY OF THE INVENTION

It is, therefore, an object of the invention to provide a pneumatic tire capable of preventing pulling-out of a ply cord and occurrence of separation failure at an end position of a turnup portion of a carcass ply and also effectively controlling failure of a bead portion due to bending deformation of the bead portion around a rim flange under an action of a high loading to improve the bead portion durability.

According to a first aspect of the invention, there is the provision of a pneumatic tire comprising at least one carcass ply of steel cords constituted with a main body portion toroidally extending from a tread portion through a sidewall portion to a bead portion and a turnup portion wound around a bead core embedded in the bead portion, in which a wrap part wound on the bead core along its outer peripheral face is disposed in the turnup portion of the carcass ply and at least one wire chafer wound around the bead core from the main body portion of the carcass ply toward the turnup portion thereof in a widthwise direction is embedded in the bead portion, and a shortest distance of a start end of the wire chafer located at the side of the main body portion of the carcass ply as measured outward from a normal line drawn to an outer face of the bead portion at a first rim line position in the radial direction of the tire is located to be within a range of 15–25 mm and a terminal end of the wire chafer located at the side of the turnup portion of the carcass ply is arranged within a range defined between a vertical line drawn from an outermost end position of the bead core in the radial direction to the outer face of the bead portion and the above normal line.

The term "first rim line position" used herein means an outermost end in the radial direction of that portion of an outer face of the tire which contacts with a rim when the tire is mounted onto an approved rim and applied under a maximum air pressure and a maximum load capacity.

In this case, the terms "maximum air pressure" and "maximum load capacity" used herein are defined according to "Year Book of The Tire and Rim Association Inc." in USA, "Standard Manual of The European Tire and Rim Technical Organization" in Europe or "JATMA Year Book" in Japan.

And also, the term "turnup portion of carcass ply" used herein includes a case that the carcass ply is wound around the bead core from an outside of the tire toward an inside thereof in the widthwise direction in addition to a case that the carcass ply is wound around the bead core from an inside of the tire toward an outside thereof in the widthwise direction.

In addition, the carcass ply is a ply wherein many steel cords each having both cut ends are arranged substantially in the radial direction but also includes a ply wherein a single steel cord is folded at a position corresponding to the turnup portion of the carcass ply and continuously extended while detouring in a circumferential direction of the tire.

When it is required to more control the occurrence of separation failure at the terminal end position of the wire chafer, it is favorable to arrange at least one organic fiber chafer covering the terminal end of the wire chafer at the side of the turnup portion of the carcass ply, and in this case the organic fiber cords in the organic fiber chafer are preferable to be arranged at an angle of 15°–75° with respect to an arranging direction of the steel cord in the wire chafer.

When it is required to more control separation failure at the start end position of the wire chafer, it is favorable to arrange a cushion rubber layer between the main body portion of the carcass ply and the start end portion of the wire chafer, and in this case a rubber thickness of the cushion rubber layer at the start end position of the wire chafer is preferable to be 1.5–2.0 mm at a section in the widthwise direction of the tire.

According to a second aspect of the invention, there is the provision of a pneumatic tire comprising at least one carcass ply of steel cords constituted with a main body portion toroidally extending from a tread portion through a sidewall portion to a bead portion and a turnup portion wound around a bead core embedded in the bead portion, a part or whole of which turnup portion being a wrap part wound along a peripheral face of the bead core, in which the main body portion of the carcass ply has a convexly curved shape toward an outer face of the tire or a combined shape of the curve and straight line at a section in a widthwise direction of the tire when the tire is mounted onto an approved rim and inflated at a maximum air pressure under no load, and a straight line or a chord connecting both ends of an arc drawn by the main body portion of the carcass ply over a zone ranging from a turning point of the main body portion on the bead core to any point in a region corresponding to 15–35% of a length in the radial direction of the tire defined between a standard line passing through an axial center of the bead core and drawn in parallel to a rotating axis of the tire and an outermost side of the main body portion in the radial direction and separated from the standard line is inclined at an angle of 45°–65° with respect to an equatorial plane of the tire.

In a preferable embodiment of the second aspect of the invention, the main body portion of the carcass ply has an arc shape convexly extending toward the outer surface of the tire over a zone ranging from the turning point of the main body on the bead core to any point in a region corresponding to 17–25% of the length in the radial direction of the tire separated from the standard line.

In another preferable embodiment, a maximum length of a vertical line drawn from the arc to a chord connecting both ends of the arc is not less than 2 mm.

According to the second aspect of the invention, the occurrence of separation failure at the turnup end of the carcass ply can be prevented by wrapping the turnup portion of the carcass ply on the peripheral face of the bead core, while the shape of the main body portion of the carcass ply in the bead portion is regulated to increase lateral stiffness of the bead portion, whereby outward fall-down deformation of the bead portion in the widthwise direction during the running of the tire under loading or the like can effectively be controlled to sufficiently prevent the occurrence of fatigue breakage in the bead portion contacting with a rim flange or the like.

BRIEF DESCRIPTION OF THE DRAWINGS

The invention will be described with reference to the accompanying drawings, wherein.

DETAILED DESCRIPTION OF THE INVENTION

Figure 4:
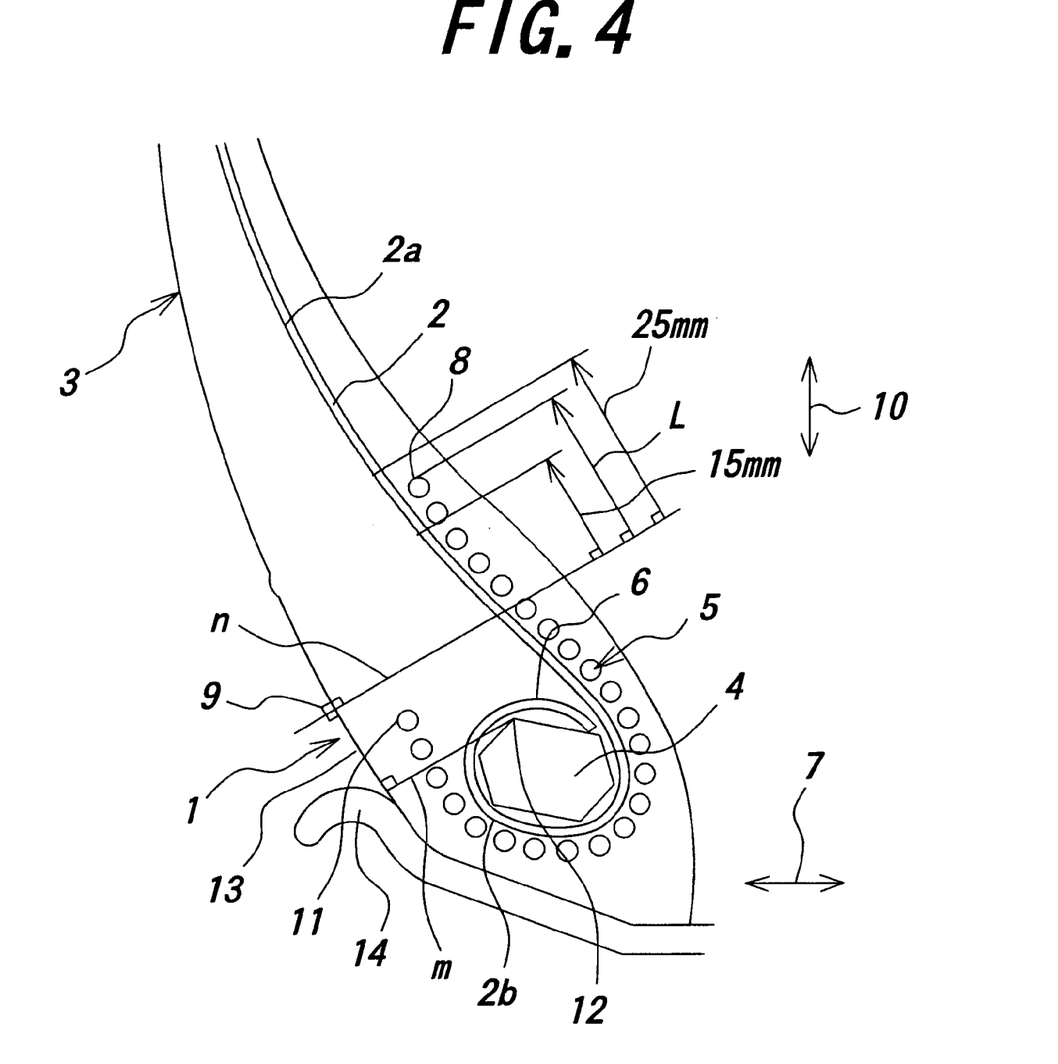
FIG. 4 is a diagrammatically partial section view illustrating a state of mounting a bead portion of a first embodiment of the pneumatic tire according to the invention onto a rim.

In FIG. 4 is shown a part of a bead portion in a first embodiment of the pneumatic tire according to the invention, wherein numeral 1 is a bead portion, numeral 2 a carcass ply, numeral 3 a sidewall portion, numeral 4 a bead core, and numeral 5 a wire chafer.

The tire having the bead portion 1 shown in FIG. 4 comprises at least one rubberized carcass ply 2 of steel cords arranged substantially in a radial direction of the tire (concretely, arranged at a cord angle of 70°–90° with respect to an equatorial plane of the tire), which is constituted with a main body portion 2a toroidally extending from a tread portion (not shown) through the sidewall portion 3 to the bead portion 1 and a turnup portion 2b wound around the bead core 4 embedded in the bead portion 1. And also, a belt (not shown) of one or more rubberized cord layers is arranged on a crown portion (not shown) of the carcass ply 2 for reinforcing the tread portion.

A main feature of the invention lies in that the bead structure of winding the carcass ply 2 around the outer surface of the bead core 4 is adopted and further the wire chafer 5 is arranged for adequately controlling the bending deformation of the bead portion in the application of a high loading to the tire. More concretely, the wrap part 6 wound around the bead core 4 along its outer peripheral face is arranged in the turnup portion 2b of the carcass ply 2, whereby the bead portion durability can considerably be improved.

That is, the pulling-out of the carcass ply 2 and the occurrence of separation failure at the turnup end position 8 of the carcass ply 2 can be prevented by winding the carcass ply 2 around the outer peripheral face of the bead core 4. In this case, the bead portion is considerably reinforced as compared with the conventional tire having the usual turnup structure (FIG. 1a).

However, when the high loading is applied to the tire, a large bending deformation about the rim flange as a fulcrum can not effectively be controlled only in the above structure, so that crack is apt to be caused in the bead portion 1 of the tire contacting with the rim flange 14 by repetition of such a bending deformation.

For this end, according to the invention, at least one wire chafer 5 wound around the bead core 4 from an inside of the tire toward an outside thereof in the widthwise direction 7 is arranged in the bead portion 1 from the main body portion 2a of the carcass ply 2 toward the turnup portion 2b thereof in addition to the above structure, and a shortest distance L of a start end 8 of the wire chafer 5 located at the side of the main body portion 2a of the carcass ply 2 as measured outward from a normal line n drawn to an outer face 13 of the bead portion 1 at a first rim line position 9 in the radial direction 10 of the tire is located to be within a range of 15–25 mm and a terminal end 11 of the wire chafer 5 located at the side of the turnup portion 2b of the carcass ply 2 is arranged within a range defined between a vertical line m drawn from an outermost end position 12 of the bead core 4 in the radial direction to the outer face 13 of the bead portion 1 and the above normal line n. According to such a structure, the above bending deformation can effectively be controlled and hence the bead portion durability can considerably improved.

The reason why the shortest distance L of the start end 8 of the wire chafer 5 is located within a range of 15–25 mm is due to the fact that when the shortest distance L is less than 15 mm, the deformation of the carcass ply in the circumferential direction can not sufficiently be controlled and hence the bending stiffness of the bead portion becomes large to facilitate the occurrence of troubles in the bead portion, while when it exceeds 25 mm, the start end 8 approaches to a flex zone, particularly in case of a low-section profile tire and stress concentrates in the start end 8 of the wire chafer 5 to facilitate the occurrence of separation failure.

And also, the reason why the terminal end 11 of the wire chafer 5 is arranged within the range defined between the vertical line m drawn from the outermost end position 12 of the bead core 4 in the radial direction to the outer face 13 of the bead portion 1 and the normal line n is due to the fact that when the terminal end 11 locates downward from the vertical line m in the radial direction 10 of the tire, the turnup portion 2b of the carcass ply 2 can not sufficiently be protected and separation failure is apt to be caused at an interface between the terminal end 11 and the turnup portion 2b, while when it locates upward from the normal line n in the radial direction 10 of the tire, a large shearing strain is applied to the terminal end 11 to facilitate the occurrence of troubles in the bead portion.

Figure 5:
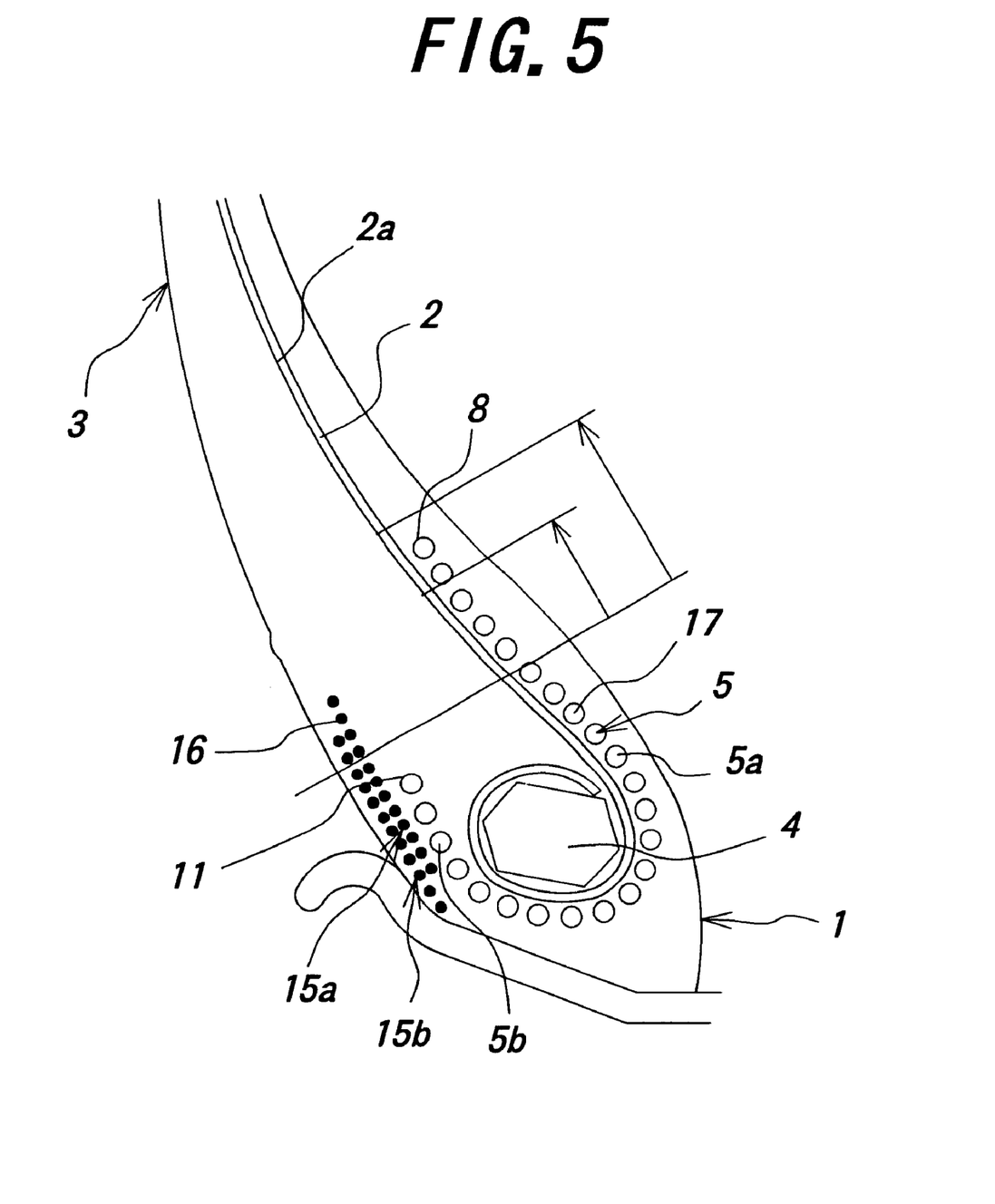
FIG. 5 is a diagrammatically partial section view illustrating a state of mounting a bead portion of a second embodiment of the pneumatic tire according to the invention onto a rim.

In a second embodiment of the invention, as shown in FIG. 5, at least one organic fiber chafer covering the terminal end 11 of the wire chafer 5 (two chafers 15a, 15b in the illustrated embodiment) may be arranged at the side of the turnup portion 2b of the carcass ply 2, whereby the shearing strain can be more controlled at the terminal end 11 of the wire chafer 5 to further improve the bead portion durability.

Furthermore, when organic fiber cords 16 in the organic fiber chafers 15a, 15b are arranged at a cord angle of 15°–75° with respect to the extending direction of steel cords 17 in the wire chafer 5, forces applied from various directions to a terminal end portion 5b of the wire chafer 5 can be born by the organic fiber cords in the organic fiber chafers, whereby the shearing strain at the position of the terminal end 11 of the wire chafer 5 can be more controlled.

Figure 6:
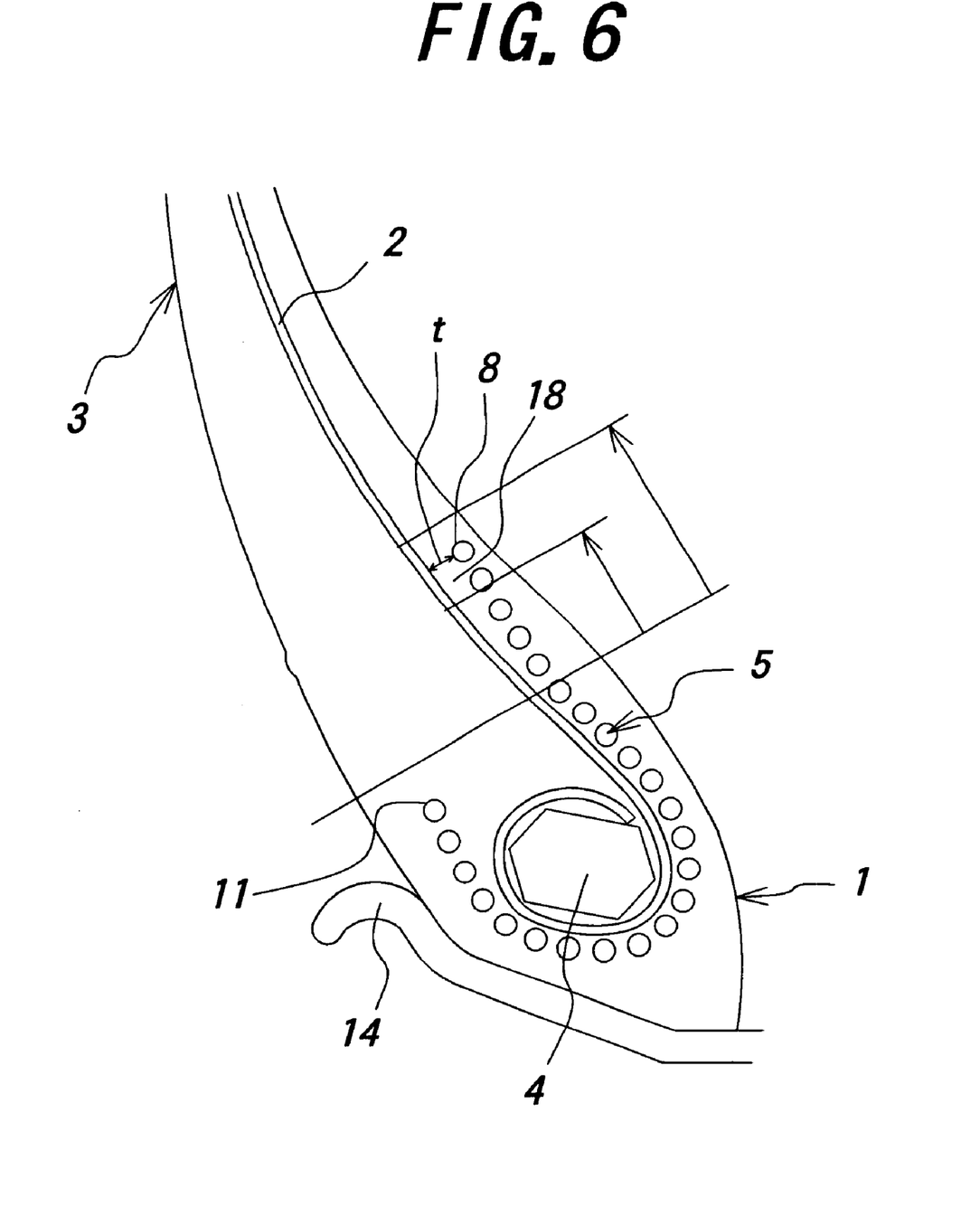
FIG. 6 is a diagrammatically partial section view illustrating a state of mounting a bead portion of a third embodiment of the pneumatic tire according to the invention onto a rim.

In addition, when it is required to more suppress separation failure at the start end 8 of the wire chafer 5, as shown in FIG. 6, it is favorable to interpose a cushion rubber layer 18 between the main body portion 2a of the carcass ply 2 and the start end portion 5a of the wire chafer 5.

In this case, it is preferable that a rubber thickness t of the cushion rubber layer 18 at the start end 8 of the wire chafer 5 is 1.5–2.0 mm viewing at a section in the widthwise direction of the tire. When the rubber thickness t is less than 1.5 mm, the effect of suppressing separation failure by the arrangement of the cushion rubber layer 18 is not sufficiently obtained, while when it exceeds 2.0 mm, there is caused a fear that the effect of controlling the deformation in the circumferential direction through the wire chafer 5 is not sufficiently obtained.

Figure 7:
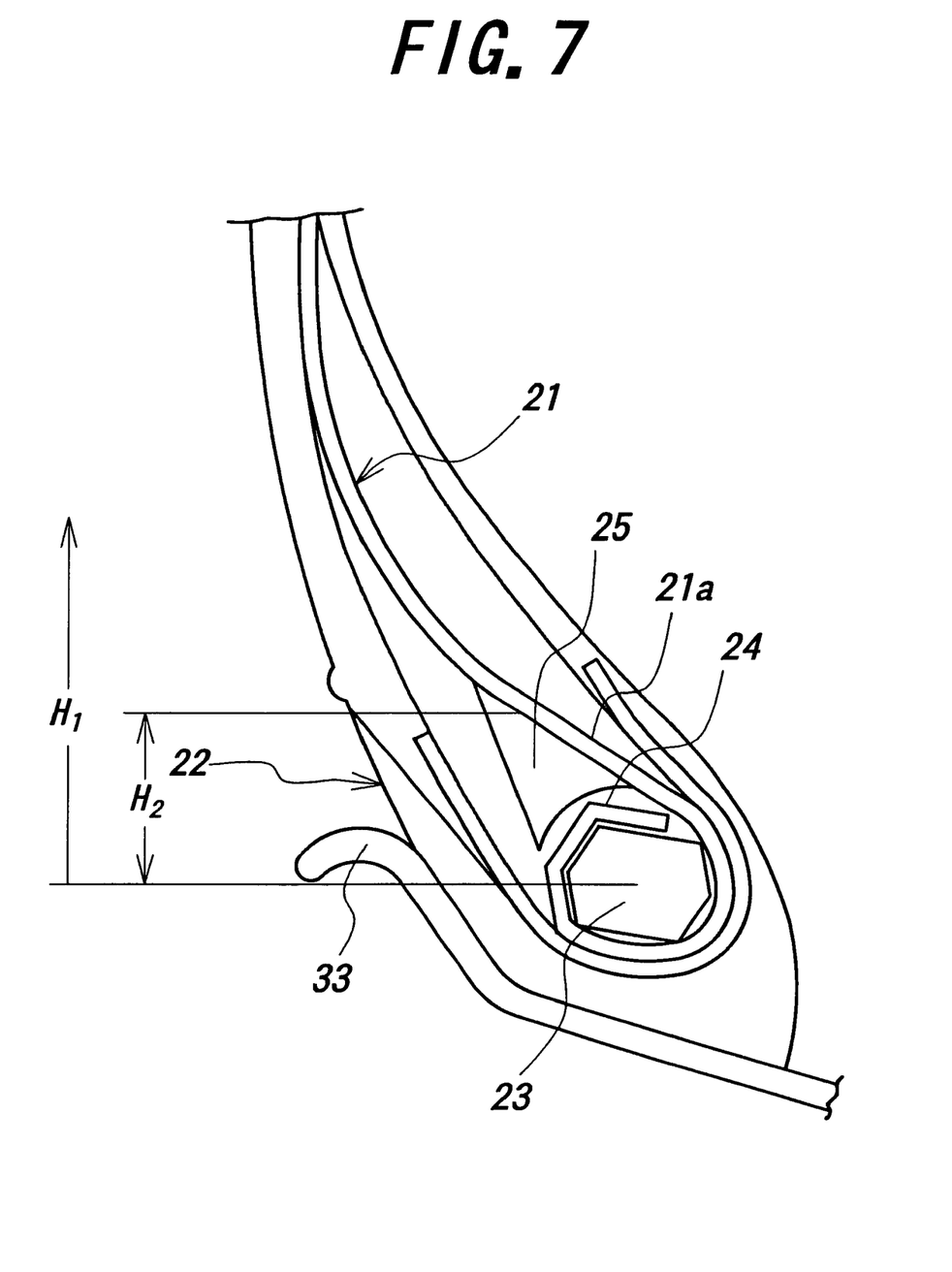
FIG. 7 is a diagrammatically partial section view illustrating a state of mounting a bead portion of a fourth embodiment of the pneumatic tire according to the invention onto a rim.

In FIG. 7 is shown a fourth embodiment of the bead portion according to the invention, wherein numeral 21 is a main body portion of a carcass ply toroidally extending from a tread portion (not shown) through a sidewall portion (not shown) to a bead portion 22. The main body portion 21 of the carcass ply is comprised of steel cords arranged at a cord angle of, preferably, about 70°–90° with respect to an equatorial plane of the tire.

Further, a side portion of the carcass ply is turned around a bead core 23 embedded in the bead portion 22 from an inside of the tire toward an outside thereof in a radial direction of the tire and then wound along an outer peripheral face of the bead core 23 to form a wrap part 24.

In the winding of the turnup portion, it is favorable that at least one site of a portion of the wrap part 24 corresponding to corner parts of the bead core 23 is subjected to a plastic deformation so as to more accurately extend along the peripheral face of the bead core. In this way, the wrap part 24 is effectively restrained by the bead core 3, whereby a fear of causing the pulling-out of the carcass ply and the separation failure of the wrap part can advantageously be removed.

Moreover, the plastic deformed site is favorable to be previously formed in a portion corresponding to the wrap part 24 prior to the winding of the carcass ply around the peripheral face of the bead core 23. In this case, the plastic deformation can be always and accurately conducted as it is expected, whereby the above effect can be more enhanced.

In the invention, the wrap part 24 can be more closed to the bead core 23 through a bead filler 25 located side the outer periphery of the bead core by sandwiching the wrap part 24 between the bead core 23 and the bead filler 25, so that the pulling-out of the carcass ply and the separation failure of the wrap part can be more advantageously prevented.

It is more favorable that the wrap part 24 is extended along the peripheral face of the bead core over a half periphery of the sectional profile of the bead core.

In the invention, it is important that the main body portion 21 of the carcass ply has a convexly curved shape toward an outer face of the tire or a combined shape of the curve and straight line at a section in a widthwise direction of the tire when the tire is mounted onto an approved rim and inflated at a maximum air pressure under no load, and a straight line or a chord connecting both ends of an arc drawn by a part a of the main body portion 21 over a zone ranging from a turning point P of the main body portion on the bead core 23 to any point ($H_2$) in a region corresponding to 15–35% of a length $H_1$ in the radial direction of the tire defined between a standard line S passing through an axial center of the bead core and drawn in parallel to a rotating axis of the tire and an outermost side of the main body portion in the radial direction and separated from the standard line is inclined at an angle θ of 45°–65° with respect to an equatorial plane O of the tire.

The turning point P of the carcass ply is a turning start point of the carcass ply against the bead core 23. More concretely, it means a point that the carcass ply extending straight toward the bead core 3 or convexly extending toward the outer surface of the tire is turned about the bead core 3 and convexly inflected toward the inner surface of the tire.

That is, when the convexly curved shape toward the outer face of the tire or the combined shape of the curve and straight line is given to the main body portion 21 of the carcass ply at the section in the widthwise direction of the tire, a carcass line under an inflation of an internal pressure can be closed to a natural equilibrium shape capable of controlling the inward falling deformation in the section as compared with the conventional one. Moreover, the term "carcass line" used herein means a center line in a thickness direction of the carcass ply constituting the main body portion at a section in the widthwise direction of the tire. Concretely, the carcass lien means a line at a center of the arranging position of the cord embedded in the carcass ply when using the one carcass ply, or a line of a center in total ply thickness when using two or more carcass plies.

Furthermore, the inclination angle θ of the zone 21a of the main body portion 21 ranging from the position of any points ($H_2$) measured from the standard line S in the radial direction of the tire up to the turning point P at the section in the widthwise direction of the tire is made to 45°–65° with respect to an equatorial plane O of the tire, whereby the main body portion 21 in the bead portion is arranged so as to more shift toward the outer surface of the tire as compared with the conventional carcass line shown in FIG. 2a. As a result, the main body 21 is disposed in the vicinity of thickness center of the bead portion, so that the rubber thickness of from the main body portion 21 to the outer surface of the tire can be thinned as compared with that of the conventional tire to control the deformation of an outer surface part of the bead portion in the circumferential direction of the tire.

When the inclination angle θ is less than 45°, the carcass lien approaches to the inner surface of the tire and becomes large in the distance from the natural equilibrium shape, while when it exceeds 65°, the distance from the natural equilibrium shape becomes also large and the effect of suppressing the falling-down is decreased.

Furthermore, the reason why the position of any points ($H_2$) from the standard line S in the radial direction of the tire is restricted to a range of 15–35% of the length in the radial direction of the tire ($H_1$) is due to the fact that when the position is within the above range, it is advantageous to make the carcass line in the inflation of the internal pressure close to the natural equilibrium shape to suppress the falling-down.

Figure 9:
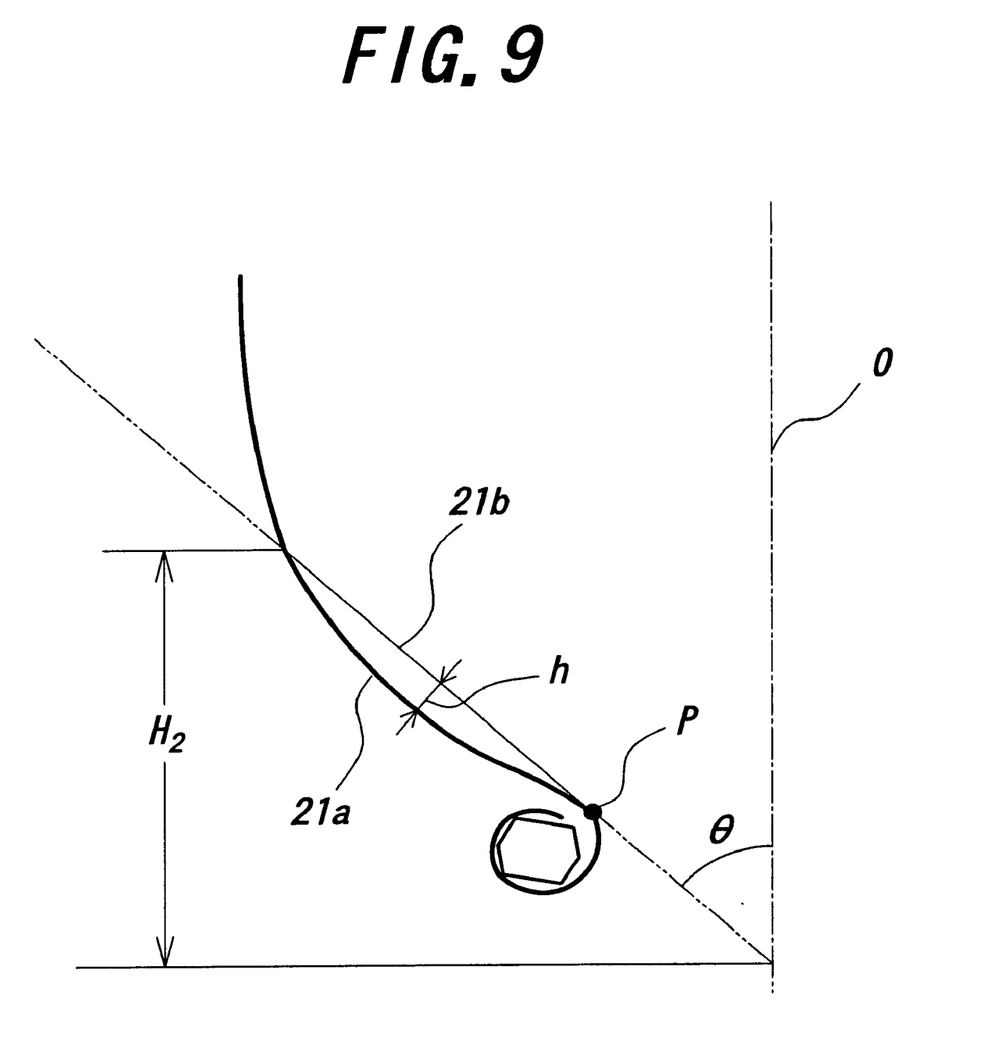
FIG. 9 is a schematic view illustrating a shape of a main body portion of a carcass ply according to the invention.

Moreover, when the zone 21a of the main body portion 21 extends straight, the inclination angle θ is an angle of a straight line with respect to the equatorial plane O, while when the zone 21a is curved as shown in FIG. 9, the inclination angle θ is an angle of a chord 21b connecting both ends of an arc corresponding to the curved line of the zone 21a to each other with respect to the equatorial plane O.

And also, when the zone 21a of the main body portion 21 is curved as shown in FIG. 9, it is favorable that a maximum length of a vertical line h drawn from the arc to the chord connecting both ends of the arc to each other is not less than 2 mm, because when the maximum length of the vertical line h is not less than 2 mm, the carcass line becomes more close to the natural equilibrium shape and the rubber thickness between the main body portion and the outer surface of the tire can be more thinned.

From the same reason as mentioned above, it is more favorable that when the zone 21a of the main body portion 21 is curved, the position of any points ($H_2$) in the radial direction of the tire corresponds to 17–25% of the length in the radial direction of the tire ($H_1$) from the standard line S defining the zone 21a.

The following examples are given in illustration of the invention and are not intended as limitations thereof.

There are provided tires of Examples 1–7 each having a tire size of TBR 315/60R22.5, wherein start end position 8 and terminal end position 11 of a wire chafer 5, presence or absence of an arrangement of a cushion rubber layer 18 and a rubber gauge t thereof, and presence or absence of an arrangement of an organic fiber chafer and a cord angle thereof are shown in Table 1.

For the comparison, there are provided tires of Comparative Examples 1–5 having a wrap structure in a bead portion and using a wire chafer provided that either start end position 8 or terminal end position 11 of the wire chafer is outside the range defined in the invention, and a tire of Conventional Example having the usual turnup structure of a carcass ply.

Each of the above tires is mounted onto a rim of 9.00× 22.5 and subjected to the following test for the evaluation of bead portion durability.

The bead portion durability is evaluated from results by a test for measuring deformation in circumferential direction and drum test for bead portion durability.

In the test for measuring the deformation in circumferential direction, a flat plate is pushed downward onto the tire under a force of 66.15 kN at a free state to measure a deformation quantity in circumferential direction.

In the drum test for bead portion durability, the tire inflated under an internal pressure of 900 kPa is run on a rotating drum at a speed of 60 km/h under a load of 66.15 kN to measure a running distance until the occurrence of troubles in the tire.

The evaluation results are shown in Table 1. Moreover, the numerical values in Table 1 are represented by an index on the basis that the conventional example is 100. In this case, the deformation in circumferential direction is smaller as the index value becomes smaller, while the bead portion durability by the drum test is better as the index value becomes larger.

TABLE 1

| | Wire chafer 5 | | Cushion rubber layer 18 | | Organic fiber chafer | | Evaluation result of bead portion durability | |
|---|---|---|---|---|---|---|---|---|
| | start end position 8 | terminal end position 11 | arrangement | rubber gauge | arrangement | cord angle | index of deformation in circumferential direction | index of bead portion durability by drum test |
| Conventional Example | L = 0 mm | +10 mm of normal line n | absence | — | absence | — | 100 | 100 |
| Comparative Example 1 | L = +30 mm | −5 mm of normal line n | presence | 1.5 | absence | — | 61 | 105 (peculiar trouble) |
| Comparative Example 2 | L = +20 mm | −5 mm of vertical line m | absence | — | absence | — | 80 | 105 (peculiar trouble) |
| Comparative Example 3 | L = +20 mm | +5 mm of normal line n | presence | 1.0 | absence | — | 81 | 110 (peculiar trouble) |
| Comparative Example 4 | L = +20 mm | +5 mm of normal line n | presence | 2.5 | absence | — | 90 | 112 (peculiar trouble) |
| Comparative Example 5 | L = +20 mm | −5 mm of vertical line m | absence | — | absence | — | 55 | 88 (peculiar trouble) |
| Example 1 | L = +15 mm | −5 mm of normal line n | presence | 1.5 | absence | — | 89 | 158 |
| Example 2 | L = +20 mm | −5 mm of normal line n | presence | 2.0 | absence | — | 83 | 193 |
| Example 3 | L = +25 mm | −5 mm of normal line n | presence | 1.5 | absence | — | 77 | 173 |
| Example 4 | L = +20 mm | on normal line n | absence | — | absence | — | 75 | 121 |
| Example 5 | L = +20 mm | −5 mm of normal line n | absence | — | absence | — | 69 | 140 |
| Example 6 | L = +20 mm | on vertical line m | absence | — | absence | — | 64 | 152 |
| Example 7 | L = +20 mm | on normal line n | absence | — | presence *1 | ±45° | 52 | 170 |

*1: two nylon chafers

As seen from the results of Table 1, Examples 1–7 are superior in the bead portion durability to the conventional example. On the other hand, Comparative Examples 1–5 indicate the occurrence of peculiar trouble in the drum test for bead portion durability.

Figure 8:
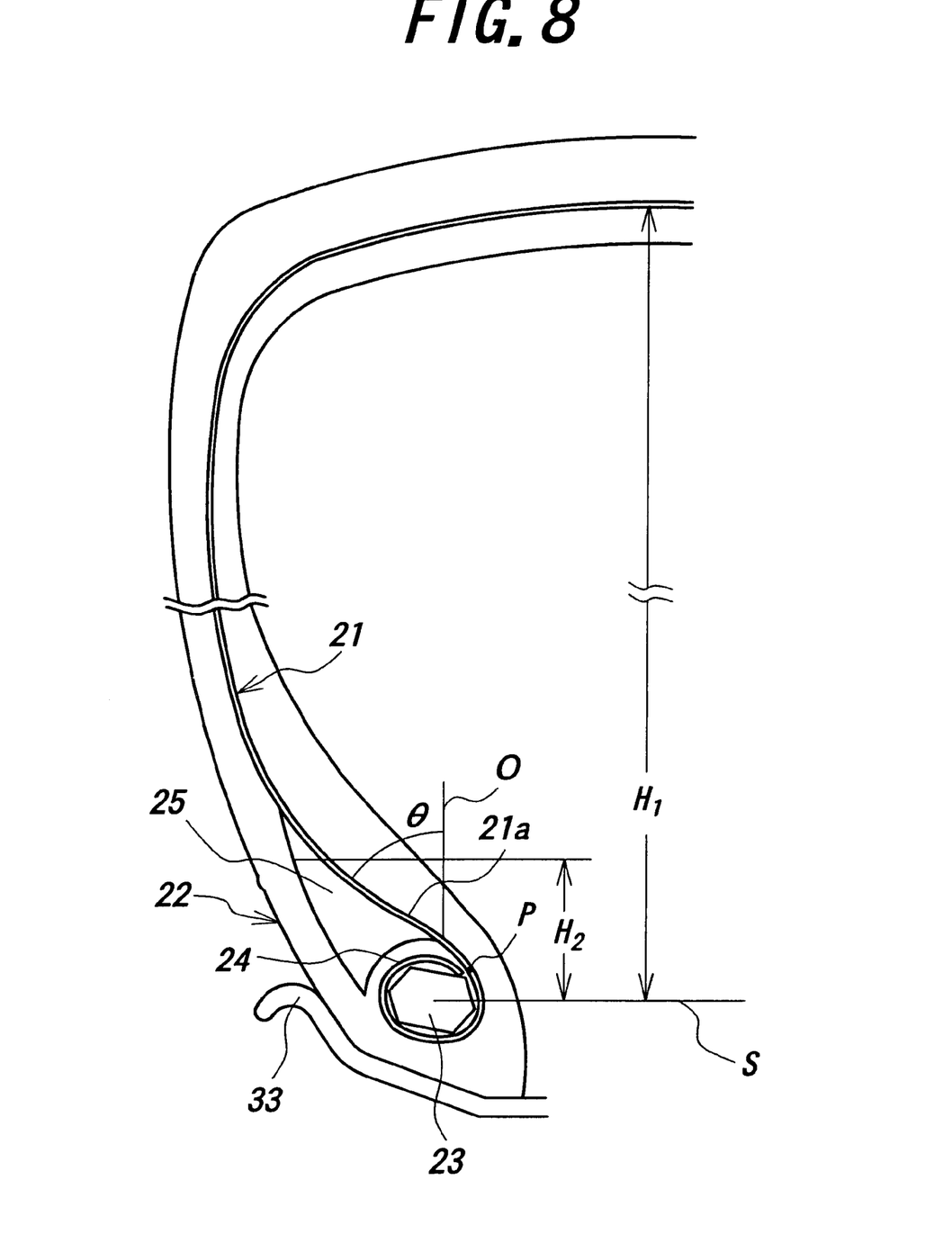
FIG. 8 is a diagrammatically partial section view illustrating a state of mounting a bead portion of a fifth embodiment of the pneumatic tire according to the invention onto a rim.

Then, there is provided a radial tire for truck and bus according to the invention having a structure shown in FIG. 8, a carcass line of a main body portion of a carcass ply defined in Table 2 and tire size of 435/45R22.5. For the comparison, there is provided a comparative tire having a structure of a main body portion of a carcass ply shown in FIG. 2a and the same tire size as mentioned above. Then, these tires are subjected to a drum test for the evaluation of durability.

That is, the tire is mounted onto a rim of 14.00×22.5, inflated under an internal pressure of 900 kpa and then run on a drum at a speed of 60 km/h under a load corresponding to 1.95 times a maximum load capacity to measure a running distance until the tire can not be run due to the occurrence of troubles in the bead portion. The measured values are shown in Table 2. Moreover, the bead portion durability is represented by an index of the measured value on the basis that the comparative tire is 100, in which as the larger the index value, the durability becomes better.

With respect to these tires, a falling-down quantity of a main body portion of a carcass ply is measured at a state that the tire is inflated under the above internal pressure and loaded under the above load based on a state that the internal pressure and load are not applied to the tire. The falling-down quantity is represented by an index on the basis that the comparative tire is 100.

Similarly, a deformation quantity in circumferential direction of an outer surface of a bead portion is measured at a state that the tire is inflated under the above internal pressure and loaded under the above load based on a state that the internal pressure and load are not applied to the tire. The deformation quantity in circumferential direction is represented by an index on the basis that the comparative tire is 100.

TABLE 2

| Carcass line | Comparative tire FIG. 2a | Invention tire FIG. 8 |
|---|---|---|
| $H_2/H_1$ | — | 22% |
| θ (°) | 33 | 55 |
| Falling-down quantity | 100 | 75 |
| Deformation quantity in circumferential direction | 100 | 84 |
| Bead portion durability | 100 | 160 |

As seen from the above, according to the invention, the wrap part wound around the bead core along the peripheral face thereof is formed in the carcass ply and the wire chafer is arranged or the shape of the main body portion of the carcass ply is made adequate, whereby the bead portion durability can largely be improved. Especially, the invention is useful in so-called heavy duty pneumatic radial tires used under higher internal pressure and load.

What is claimed is:

1. A pneumatic tire comprising a carcass ply of steel cords constituted with a main body portion toroidally extending from a tread portion through a sidewall portion to a bead portion and a turnup portion wound around a bead core embedded in the bead portion, in which a wrap part wound on the bead core along its outer peripheral face is disposed in the turnup portion of the carcass ply and at least one wire chafer wound around the bead core from the main body portion of the carcass ply toward the turnup portion thereof in a widthwise direction is embedded in the bead portion, and a shortest distance of a start end of the wire chafer located at the side of the main body portion of the carcass ply as measured outward from a normal line drawn to an outer face of the bead portion at a first rim line position in the radial direction of the tire is located to be within a range of 15–25 mm and a terminal end of the wire chafer located at the side of the turnup portion of the carcass ply is arranged within a range defined between a vertical line drawn from an outermost end position of the bead core in the radial direction to the outer face of the bead portion and the above normal line.

2. A pneumatic tire according to claim 1, wherein at least one organic fiber chafer covering the terminal end of the wire chafer is arranged at the side of the turnup portion of the carcass ply.

3. A pneumatic tire according to claim 2, wherein organic fiber cords in the organic fiber chafer are arranged at an angle of 15°–75° with respect to an arranging direction of steel cord in the wire chafer.

4. A pneumatic tire according to claim 1, wherein a cushion rubber layer is arranged between the main body portion of the carcass ply and the start end portion of the wire chafer.

5. A pneumatic tire according to claim 4, wherein a rubber thickness of the cushion rubber layer at the start end position of the wire chafer is 1.5–2.0 mm at a section in the widthwise direction of the tire.

* * * * *